June 7, 1927.
J. D. TEW
1,631,707
VULCANIZING METHOD AND APPARATUS
Filed June 25, 1926
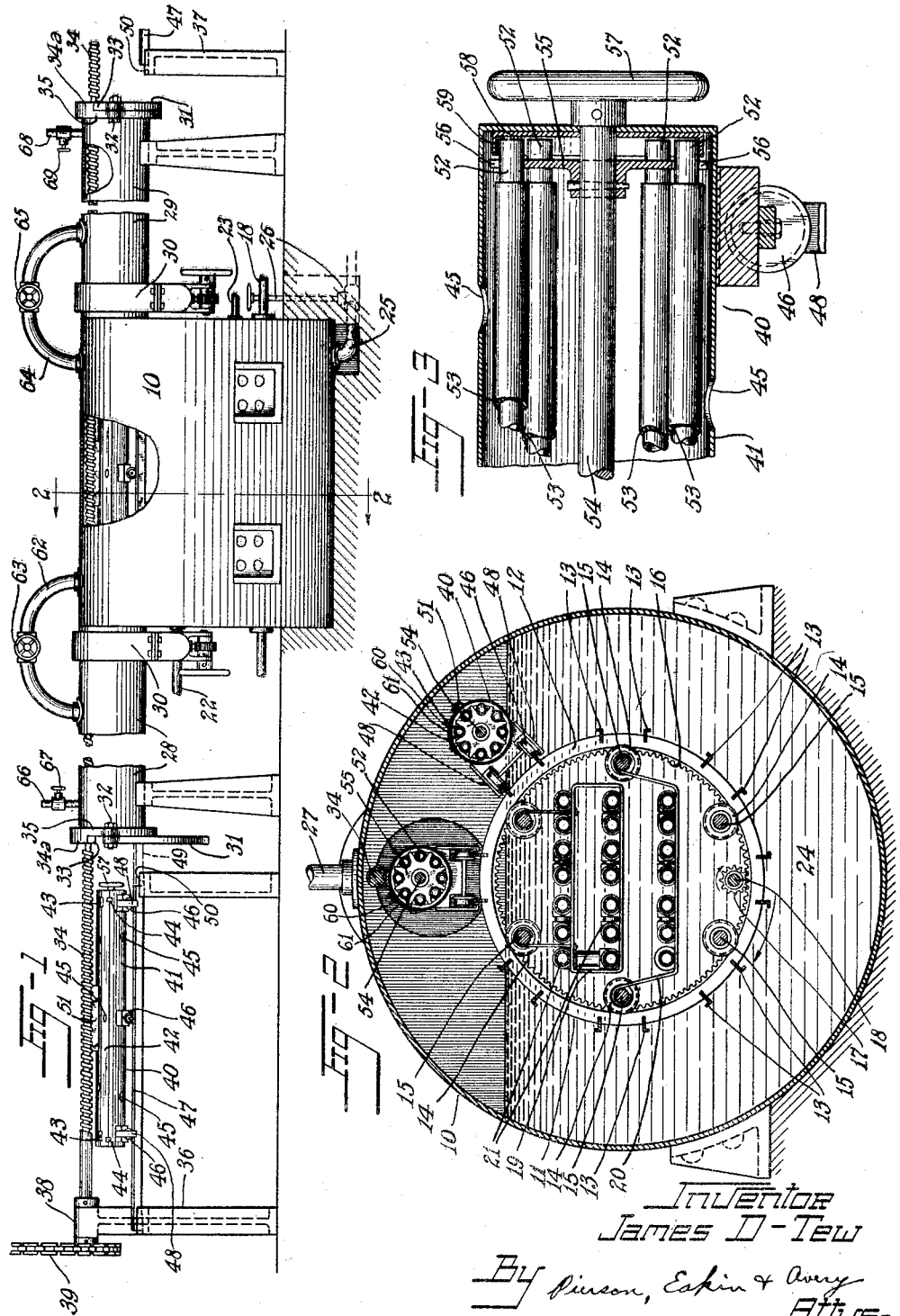
Inventor
James D. Tew
By Pierson, Eakin & Avery
Attys.

Patented June 7, 1927.

1,631,707

UNITED STATES PATENT OFFICE.

JAMES D. TEW, OF HUDSON, OHIO, ASSIGNOR TO THE B. F. GOODRICH COMPANY, OF NEW YORK, N. Y., A CORPORATION OF NEW YORK.

VULCANIZING METHOD AND APPARATUS.

Application filed June 25, 1926. Serial No. 118,445.

This invention relates to apparatus for treating articles with a liquid under pressure, as in vulcanizing rubber articles under water.

In using water as a vulcanizing medium economy of heat may be effected by maintaining the water at an elevated temperature, above the normal boiling point, between vulcanizing operations, as distinguished from permitting the water to "blow down" to atmospheric pressure and the normal boiling temperature for the removal of vulcanized articles and the introduction of articles to be vulcanized, and one of my chief objects is to provide improved procedure and apparatus adapted for maintaining the water under super-atmospheric pressure while articles to be vulcanized are submerged in and removed from the water.

A more specific object is to provide apparatus of this character in which the water may remain in the same container both during and between the vulcanizing periods of successive batches of the articles.

Another object is to provide procedure and apparatus wherein the vulcanizing may be performed as a continuous process, in the sense that articles are introduced to the vulcanizing medium and removed therefrom at intervals of time less than the vulcanizing period and a comparatively large number of the articles are at all times in process of vulcanization.

Another object is to provide for quick submergence of the articles in the vulcanizing medium, so that the articles of a given batch may be submerged at approximately the same time, to avoid uneven vulcanization of the several articles in the batch.

A further object is to provide for so passing the batch of articles into and out of the liquid that the first articles of the batch to pass into the liquid are also the first to be removed therefrom, in order to obtain uniformity of vulcanization.

In accomplishing these objects I provide apparatus comprising a liquid-containing chamber in which the liquid may remain while successive batches of the articles to be vulcanized or otherwise treated are submerged in and removed from the liquid, and provide a pressure-fluid lock or locks whereby the batches of the articles in succession may be introduced into the chamber, submerged in the liquid and then removed therefrom and from the chamber while the liquid is continuously maintained under super-atmospheric pressure, as in the case of water at a temperature higher than the normal boiling temperature and permissibly, as is preferable in some instances, at a pressure greater than that due to its temperature.

Of the accompanying drawings:

Fig. 1 is a side elevation of apparatus embodying and adapted to carry out my invention in its preferred form, parts being broken away for clearness and to foreshorten the figure.

Fig. 2 is a section of the same on line 2—2 of Fig. 1.

Fig. 3 is a fragmentary vertical section of a work-supporting car constituting a part of the apparatus.

Referring to the drawings, the apparatus comprises a vulcanizing tank or chamber 10 having within it a turret 11 which comprises a pair of end rings, such as the end ring 12, connected by a circumferential series of pairs of flanged car-rails 13, 13 set into the outer peripheries of the rings, each of the rings being journaled at its inner periphery upon a circumferential series of flanged rollers, such as the rollers 14, 14, journaled upon bars 15, 15 which preferably extend the length of, and are secured in the end walls of the chamber 10, to serve as tie-rods for the said end walls as well as journals for the rollers 14.

The rollers 14 of at least one of the sets are of waisted form so as to accommodate an internal gear ring 16 mounted in one of the end rings 12. Meshed with the said gear ring is a pinion 17 secured upon a drive shaft 18 extending through the end walls of the chamber 10 and provided with suitable means (not shown) for rotating it and for thus driving the turret 11.

Supported upon cradles 19, 20 suspended from certain of the journal or tie rods 15 is a steam coil 21 having inlet and outlet pipes 22, 23 respectively extending through the end walls of the chamber, Fig. 1, for keeping at vulcanizing temperature a body of water 24 contained in the chamber. A pipe 25 (Fig. 1) for conducting water or other fluid into or out of the tank communicates with the lowermost part of the tank and is provided with a stop valve 26.

For conducting fluid such as compressed air into the tank to maintain the water 24 at a desired pressure therein a pipe 27 (Fig. 2) leads into the top of the tank. Sealed to and projecting from each end of the tank 10 at its top is a tube, one of the same being designated 28 and the other 29 in Fig. 1, each of these tubes being adapted to serve as an air or gas lock, being provided near its end adjacent the tank 10 with a gate valve device 30 and at its outer end with a gate valve 31 hinged at 32 to close against a plate 33 constituting a half bearing for a screw shaft 34 which is journaled in partial end closures of the tubes 28, 29. Each of the said parital end closures is formed by the plate 33 and the adjacent portion 34ᵃ of an end fitting 35 mounted upon the tube. The screw shaft 34 extends entirely through the tubes and the tank 10, the thread being omitted at the positions where the shaft passes through the bearing structures just described. The end portions of the screw shaft 34, outside of the tubes 28, 29, extend respectively over a receiving table 36 and a delivery table 37, and the end portion of the screw shaft over the table 36 is journaled in a bearing 38 rising from the table and is provided with a sprocket for a drive chain 39 for rotating the screw shaft.

A set of work-conveying cars 40, 40 are provided, of which each comprises a cylindrical shell 41 including a door 42 hinged at 43, 43 and extending the full length of the shell, latches 44, 44 being provided for holding the door in closed position. The shell is formed with holes 45, 45 to permit circulation of fluid therethrough when the car is within the vulcanizing tank 10. The car is provided with wheels 46, 46 adapted to run upon a pair of rails such as the rails 47, 47 mounted upon the tables 36, 37 in alignment with the respective tubes 28, 29, and the car is provided with keepers 48, 48 adapted to take under the rails 13 of the turret 11 when the car is run into the vulcanizing tank 10, to support the car in position upon the periphery of the turret when the latter is rotated and the car consequently inverted in the vulcanizing tank. Removable rails such as the rail shown in dotted lines at 49 (Fig. 1) are adapted to be mounted in the tube 28 or 29 and to fit into slots such as are shown at 50, 50 in the tops of the adjacent legs of the table 36 or 37 to support the cars as they are run from the table 36 through the tube 28 into the vulcanizing tank 10 or from the latter through the tube 29 onto the table 37.

Mounted on the top of the shell 41 of each car 40 is a screw block 51 formed with segmental threads adapted to mesh with the thread of the screw shaft 34 so that rotation of the latter will impel the car from the table 36 into the vulcanizing tank 10 and onto the turret 11, and, subsequently, from the turret 11 and tank 10 through the tube 29, onto the rails 47 of the delivery table 37.

For receiving inner tube mandrels 52, 52 within the shell 41 of the car and for supporting the mandrels with tubes 53, 53 thereon out of contact with each other, each shell 41 has journaled in its end walls a central shaft 54 upon which is secured within each end portion of the shell a spider 55 formed at its periphery with a circumferential series of notches 56, 56, Fig. 3, the said notches being adapted to receive respective end portions of the mandrels 52 as the latter are mounted in the shell by passing them through the opening of the door 42. The shaft 54 is provided outside of the shell with a hand wheel 57 for rotating the shaft to bring successive pairs of the notches 56 adjacent the opening of the door 42 for the reception of the successive mandrels, and for retaining the mandrels within the notches 56 as the spiders 55 are rotated a plate such as the plate 58 is secured to the inner face of each end wall of the shell, and the said plate is formed with a flange 59 adapted to receive within it the adjacent end portions of the mandrels, the said flange 59 being interrupted by a notch as shown at 60 (Fig. 2), to permit the passage of the mandrels into the notches 56 of the spider. The door 42 has secured to each of its ends a block 61 (Fig. 2) adapted to fit into the notch 60 of the plate 58 to retain the last mounted mandrel 52 within the notches 56 of the spider.

For equalizing fluid pressures in the vulcanizing tank 10 and in the air lock tube 28 the tank and the tube are connected by a bypass pipe 62 provided with a stop valve 63, and a similar by-pass pipe 64 and stop valve 65 are provided for making and breaking communication between the vulcanizing tank 10 and the air lock tube 29. For releasing fluid pressure within the air lock tube 28 the said tube is provided with a vent pipe 66 controlled by a stop valve 67, and a similar vent pipe 68 and stop valve 69 are provided for the air lock tube 29.

In the operation of the apparatus the turret 11 is rotated at intervals to bring the pairs of rails 13 in succession into alignment with the air lock tubes 28, 29, the screw lock 51 of the adjacent car 40 thus being brought into mesh with the screw shaft 34. The valve 31 of the tube 28 being open and its valve 30 being closed, while the valve 30 of the tube 29 is open and its valve 31 closed, the screw shaft is rotated to drive a car of stock from the table 36 into the air lock tube 28 and at the same time drive the car of vulcanized stock from the vulcanizer 10 into the air lock tube 29. The shaft is then stopped while the valve 31 of the tube 28 is closed and its valve 30 opened, and the valve 30 of the tube 29 closed and its valve 31 opened, after which the shaft is again rotated to pass the car of unvulcanized stock from the tube 28 into the vulcanizer and to pass the car of vulcanized stock from the tube 29 onto the table 37. Pressures are of course equalized through the pipe 62 or 64 before the opening of the adjacent gate valve 30. Each valve 31 is opened only when the adjacent valve 30 is closed, and the air lock tube, 28 or 29, is vented by means of the pipe 66 or 68 before the valve 31 is opened.

The procedure described being repeated at determinate intervals with successive batches of the articles to be vulcanized, the batches are carried in procession into and out of the water 24 and are thus vulcanized in overlapping periods, several of the cars being at all times submerged in the water. The articles may be allowed to remain in the vulcanizer above the water level for a sufficient time to be softened by the steam and they then may be quickly plunged into the water by rotation of the turret. The water may be kept under such pressure as may be desired, preferably by the injection of air through the pipe 27 if a pressure higher than the temperature pressure is desired. Only a small amount of steam, or mixture of air and steam, is discharged from the vulcanizer at each operation of the air lock tubes 28, 29. As the water is kept constantly in the same tank radiation of heat may be kept low, as compared with passing the water through a pipe to another container between vulcanizing operations.

My invention renders unnecessary the rapid heating of the water at intervals, as by bubbling steam into it, since the water, remaining in the same position, may be continuously heated and thus kept at a substantially even temperature by simple heating means such as the steam coil shown.

Various modifications are possible within the scope of my invention and I do not wholly limit my claims to the specific procedure or construction described.

I claim:

1. The method of treating articles with a liquid which comprises passing them through a gas lock into a liquid-containing chamber, there submerging them in a liquid contained in the chamber, lifting them from the liquid, and passing them, through a gas lock, out of the chamber.

2. A method as defined in claim 1 in which successive articles are passed in procession and without reversal of movement through a determinate path in a continuous operation.

3. The method of vulcanizing rubber articles which comprises passing them through a steam lock into a vulcanizer, there submerging them in water at a temperature above the normal boiling point, lifting them from the water, and passing them, through a steam lock, out of the chamber, while maintaining the water at super-atmospheric pressure.

4. A method as defined in claim 3 in which the articles are so carried in groups into and out of the water that the first articles of the group to enter the water are also the first to leave it.

5. Apparatus for treating articles with a liquid, the said apparatus comprising a liquid-containing chamber, a liquid in said chamber, and a gas lock, above the level of the liquid in the chamber, for passing articles into and out of the chamber.

6. Appparatus as defined in claim 5 including means in the chamber for lowering and raising the articles to submerge them in the liquid and to lift them therefrom.

7. Vulcanizing apparatus comprising a vulcanizing tank, a body of water therein, the tank being of such relative depth as to permit lowering and raising of the articles to be vulcanized therein through such range of movement as completely to submerge the articles in the water and to support them in the tank above the level of the water, means having a part in said tank for so lowering and raising the articles, means for heating the water, and steam lock means for passing the articles from the outer atmosphere into the water and vice versa while maintaining the water at super-atmospheric pressure.

8. Vulcanizing apparatus comprising a vulcanizing chamber, water in said chamber of such depth as completely to submerge articles to be vulcanized, lock means for passing the articles into and out of the chamber while maintaining the water at super-atmospheric pressure, and means for so applying heat to the water in the chamber as to maintain it at vulcanizing temperature during the passing of a succession of articles into and out of the chamber.

9. Apparatus as defined in claim 8 including a turret in the chamber for submerging in and lifting from the water successive articles to be vulcanized.

In witness whereof I have hereunto set my hand this 23rd day of June, 1926.

JAMES D. TEW.